(12) United States Patent
Gomez

(10) Patent No.: US 11,073,134 B2
(45) Date of Patent: Jul. 27, 2021

(54) HOISTING ACCESSORIES FOR WIND TURBINES, KITS AND METHODS

(71) Applicant: General Electric Company, Schenectady, NY (US)

(72) Inventor: Daniel Gomez, Barcelona (ES)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 16/222,101

(22) Filed: Dec. 17, 2018

(65) Prior Publication Data
US 2019/0195200 A1 Jun. 27, 2019

(30) Foreign Application Priority Data
Dec. 22, 2017 (EP) .................................. 17382890

(51) Int. Cl.
| F03D 13/10 | (2016.01) |
| B66D 1/36 | (2006.01) |
| B66D 1/60 | (2006.01) |
| F03D 1/06 | (2006.01) |
| F03D 80/00 | (2016.01) |

(52) U.S. Cl.
CPC ............. *F03D 13/10* (2016.05); *B66D 1/36* (2013.01); *B66D 1/60* (2013.01); *F03D 80/00* (2016.05); *F03D 1/0658* (2013.01); *F05B 2230/61* (2013.01); *F05B 2240/916* (2013.01)

(58) Field of Classification Search
CPC ......... B66D 1/36; F03D 13/10; F03D 1/0658; F05B 2230/61; F05B 2230/916
See application file for complete search history.

(56) References Cited

U.S. PATENT DOCUMENTS

| 7,931,254 | B2 * | 4/2011 | Teichert | .................... B66D 1/38 254/273 |
| 8,052,396 | B2 * | 11/2011 | Wobben | ................ F03D 1/0658 416/244 R |

(Continued)

FOREIGN PATENT DOCUMENTS

| CN | 202880704 U | * | 4/2013 |
| CN | 107500129 A | * | 12/2017 |

(Continued)

OTHER PUBLICATIONS

JP-6290647-B2 machine translation (Year: 2018).*

(Continued)

*Primary Examiner* — Jacob J Cigna
*Assistant Examiner* — Michael W Hotchkiss
(74) *Attorney, Agent, or Firm* — Dority & Manning, P.A.

(57) ABSTRACT

The disclosure relates to hoisting accessories for wind turbines. The hoisting accessory is configured to be rotatably attached to the rotor hub and is further configured to assume a hoisting configuration and a passive configuration, wherein in the hoisting configuration, a wind turbine blade can be hoisted and mounted substantially vertically to the rotor hub, and wherein in the passive configuration, the rotor hub carrying one or more wind turbine blades can be rotated. The present disclosure also relates to kits including such hoisting accessories and methods of hoisting wind turbine blades.

10 Claims, 9 Drawing Sheets

(56) References Cited

U.S. PATENT DOCUMENTS

| | | | | |
|---|---|---|---|---|
| 8,319,363 | B2* | 11/2012 | Song | F03D 13/10 290/44 |
| 8,596,614 | B2* | 12/2013 | Numajiri | B66C 23/207 254/329 |
| 8,651,462 | B2* | 2/2014 | Van Berlo | B66C 23/207 254/278 |
| 8,789,274 | B2* | 7/2014 | Bywaters | H02K 7/1838 254/278 |
| 8,845,297 | B2* | 9/2014 | From | F03D 1/0658 416/244 R |
| 8,851,309 | B2* | 10/2014 | Pedersen | B66C 23/207 212/223 |
| 9,476,403 | B2* | 10/2016 | Smith | B66C 1/108 |
| 10,113,530 | B2* | 10/2018 | Neumann | F03D 1/0658 |
| 10,508,645 | B2* | 12/2019 | Johnson | F03D 1/0658 |
| 2007/0290426 | A1* | 12/2007 | Trede | F03D 80/50 269/1 |
| 2010/0139062 | A1* | 6/2010 | Reed | F03D 13/10 29/23.51 |
| 2010/0254813 | A1* | 10/2010 | Dawson | B66D 1/60 416/146 R |
| 2011/0042632 | A1* | 2/2011 | Van Berio | F03D 13/10 254/264 |
| 2012/0073118 | A1* | 3/2012 | Bywaters | H02K 15/02 29/596 |
| 2012/0073134 | A1 | 3/2012 | Bywaters et al. | |
| 2012/0217089 | A1* | 8/2012 | Fenger | F03D 80/50 182/2.1 |
| 2012/0228881 | A1* | 9/2012 | Siegfriedsen | F03D 13/20 290/55 |
| 2013/0318789 | A1* | 12/2013 | Gabeiras | F03D 1/0658 29/889.7 |
| 2014/0010658 | A1* | 1/2014 | Nielsen | F03D 80/50 416/204 R |
| 2014/0109407 | A1* | 4/2014 | Neumann | F03D 1/0658 29/889.1 |
| 2014/0360015 | A1* | 12/2014 | Lohan | F03D 1/0658 29/889.1 |
| 2015/0048043 | A1* | 2/2015 | Laurens | B66C 23/207 212/179 |
| 2015/0232307 | A1* | 8/2015 | Holloway | F03D 80/50 414/800 |
| 2015/0233341 | A1 | 8/2015 | Neumann et al. | |
| 2015/0300037 | A1* | 10/2015 | Pellerin | E04H 12/342 52/173.1 |
| 2016/0040649 | A1* | 2/2016 | Smith | B66C 23/207 415/121.3 |
| 2017/0067447 | A1* | 3/2017 | Reynolds | B66C 1/108 |
| 2018/0003157 | A1* | 1/2018 | Ebbesen | F03D 1/0658 |
| 2018/0290864 | A1* | 10/2018 | Garitaonandia Aramberri | B66C 23/185 |
| 2019/0181730 | A1* | 6/2019 | Christensen | F03D 9/255 |

FOREIGN PATENT DOCUMENTS

| | | | |
|---|---|---|---|
| EP | 2369174 B1 * | 11/2012 | F03D 80/50 |
| EP | 2617987 A1 | 7/2013 | |
| JP | 6290647 B2 * | 3/2018 | |

OTHER PUBLICATIONS

Machine Translation of CN-202880704-U (Year: 2013).*
Machine Translation of CN-107500129-A (Year: 2017).*
European Search Report Corresponding to EP173828906 dated Jul. 3, 2018.

* cited by examiner

HOISTING ACCESSORIES FOR WIND TURBINES, KITS AND METHODS

FIELD OF THE INVENTION

Embodiments of the present disclosure relate to hoisting accessories for wind turbines. The present disclosure further relates to kits including such hoisting accessories and methods for installing blades in a wind turbine.

BACKGROUND OF THE INVENTION

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

A known way of mounting a wind turbine includes the steps of transporting the different elements to the site of the wind turbine, assembling the tower sections and the tower, lifting the wind turbine nacelle with a large crane and mounting the nacelle on top of the tower. Then the wind turbine rotor hub can be lifted with the crane and mounted to a rotor shaft and/or the nacelle.

Additionally, one or more blades are mounted to the wind turbine rotor hub. The rotor hub generally comprises a plurality of annular mounting flanges with openings. The blade can comprise a plurality of fasteners, such as bolts, or pins or studs at its blade root. During installation, these fasteners are to be fitted into the openings in the mounting flanges.

It is known to hoist a complete rotor assembly, i.e. the hub with the plurality of blades, and mount it to e.g. the nacelle. But in order to mount a complete rotor assembly, a large surface area is required on the ground, which is typically not available e.g. in the case of offshore wind turbines.

It is further known to mount an incomplete rotor assembly on the nacelle, e.g. the hub with two blades and subsequently, mount the remaining blade. In these cases, the rotor with the two blades is normally mounted with the two blades pointing upwards, i.e. the so-called "bunny ears" configuration. There is thus no need for rotating the wind turbine rotor as the third blade could be vertically mounted from below. However, in order to be able to perform these operations, the prevailing wind speed has to be below a predetermined value for a prolonged period time. The period of time depends on the expected length of the installation step and a safety factor to be taken into account.

It is also known to mount each of the plurality of blades substantially horizontally or substantially vertically. This means that individual installation steps may require less time and may be performed at higher winds, thus increasing the time windows available for installation.

Typically, to install a blade onto the wind turbine hub, the large crane previously used to install e.g. the tower, the nacelle and the rotor hub can be operated in order to raise the blade relative to the rotor hub. Unfortunately, it is expensive to operate such large cranes. In fact, the costs of employing such large cranes currently accounts for a significant portion of the overall costs associated with wind turbine installations.

Particularly, after the tower has been erected, the nacelle has been mounted on top of the tower and between the mounting of the rotor hub to the nacelle and the mounting of the blades to the rotor hub, there is a time frame wherein the crane is not used. In practice, this may mean that personnel and lifting equipment including the above-commented expensive cranes may be in stand-by e.g. during days. This can represent a significant cost.

SUMMARY OF THE INVENTION

In a first aspect of the present disclosure, a hoisting accessory for a wind turbine is provided. The wind turbine comprises a rotor hub positioned on a wind turbine tower such that the rotor hub is configured to rotate around a rotational axis, and the rotor hub comprises one or more blade mounting surfaces. The hoisting accessory comprises a connector configured being rotatably attached to the rotor hub, a hoist guide comprising one or more wire guides for guiding hoisting wires to a wind turbine blade. The hoist guide is pivotally connected to the connector and the hoisting accessory further comprises a first steering mechanism for controlling an orientation of the hoist guide with respect to the connector.

According to this first aspect, a hoisting accessory for aiding in the hoisting (and mounting) of one or more blades to the rotor hub is provided. In this regard, the use of a large crane in order to hoist and install one or more blades to the rotor hub is avoided.

A hoist guide carries one or more rollers that guide the hoisting towards a wind turbine rotor blade. The hoist guide can pivot with respect to a connector which is connected to the hub. The hoist guide can thus assume different configurations: a hoisting configuration in which the hoisting accessory can be used in hoisting a wind turbine blade, and a passive configuration. In the passive configuration the rotor hub with an already installed blade can be rotated without the hoist guide interfering with the hub or the blade. The connector of the hoisting accessory is rotatably mounted to the hub, so that it can assume a suitable position for hoisting blades even if the hub is rotated from one position (for hoisting a first blade) to a second position (for hoisting a second blade). The disassembly of the hoisting accessory between blade mounting operations is thus avoided and this may save time during installation of the blades. In some example, the installation of three blades may be performed in less than 10 hours.

Moreover, as mentioned before, no large crane is needed for installing the blades. Such a crane may thus be used for erecting a next wind turbine tower in a wind part rather than for hoisting blades.

Additionally, one or more blades may be mounted to the rotor hub using the hoisting accessory in a desired position e.g. vertically. Thus, the need to reach positions for installing the blades higher than the hub may be avoided. Additionally, the blades may be mounted one by one, at higher wind speeds than if the hub with several blades were to be hoisted. More time windows for such installations may thus be available, thus shortening installation time and reducing installation cost.

The use of a hoisting accessory can thus provide a cost-effective solution in order to install blades to the rotor hub.

In a further aspect, a method for hoisting a first and second wind turbine blade to a rotor hub of a wind turbine is provided. The wind turbine comprising a rotor hub positioned on a wind turbine tower such that the rotor hub is configured to rotate around a rotational axis, the rotor hub comprising one or more blade mounting surfaces. The method comprises: rotatably attaching a connector to the rotor hub, a hoist guide comprising one or more wire guides for guiding hoisting wires being pivotally connected to the connector; hoisting the first wind turbine blade using the hoist guide in a hoisting position, attaching a root of the first wind turbine blade to a first blade mounting surface of the blade mounting surfaces. The method further comprises: pivoting the hoist guide to a passive position, rotating the hub, pivoting the hoist guide to the hoisting position and hoisting the second wind turbine blade.

A blade can be hoisted with two attachment points, one near the blade root and one in a mid span portion or near a blade tip. The hoisting accessory mounted at the hub guides the hoisting wires towards the blade root portion. By using winches to reel in and let out the hoisting wires, the blade can be lifted but also rotated as it is being lifted. The blade can thus assume a vertical position and be mounted substantially vertically to the rotor hub.

DETAILED DESCRIPTION OF EXAMPLES

Figure 1:
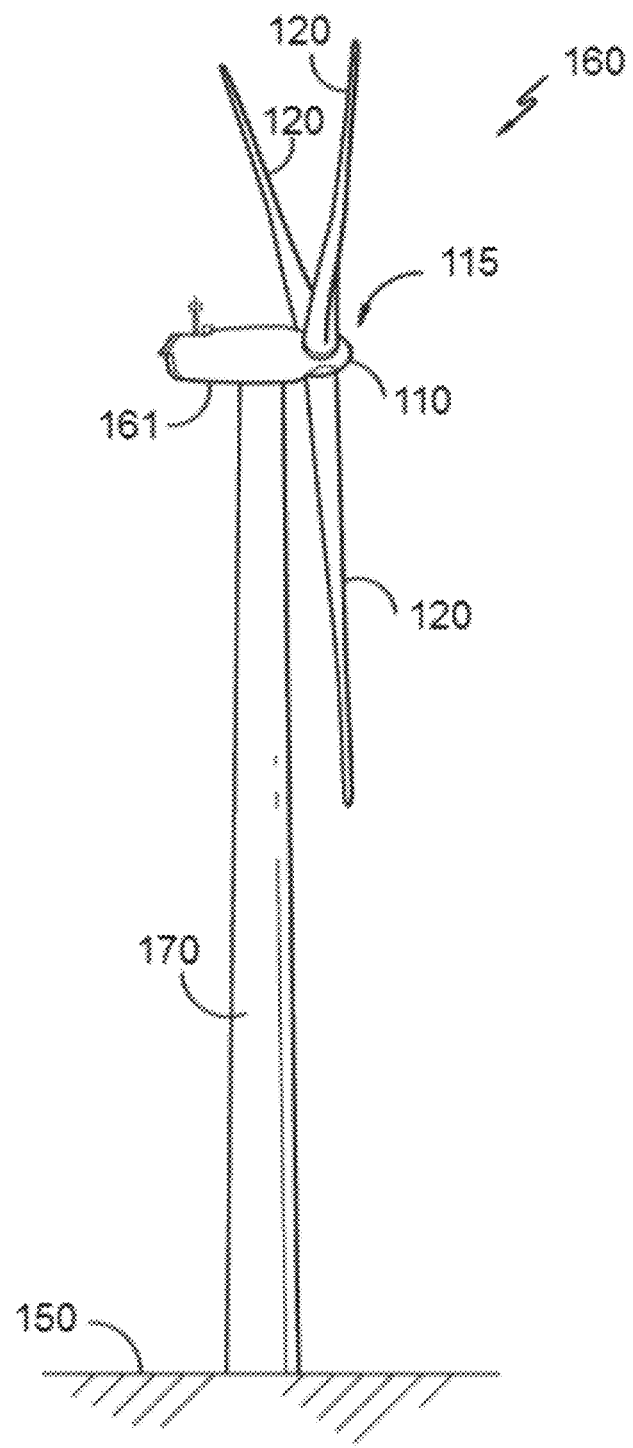
FIG. 1 illustrates a perspective view of one example of a wind turbine.

Reference now will be made in detail to embodiments of the invention, one or more examples of which are illustrated in the drawings. Each example is provided by way of explanation of embodiments of the invention, not limitation of embodiments of the invention. In fact, it will be apparent to those skilled in the art that various modifications and variations can be made in the present embodiments of invention without departing from the scope or spirit of the embodiments of invention. For instance, features illustrated or described as part of one embodiment can be used with another embodiment to yield a still further embodiment. Thus, it is intended that the present embodiments of invention covers such modifications and variations as come within the scope of the appended claims and their equivalents.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
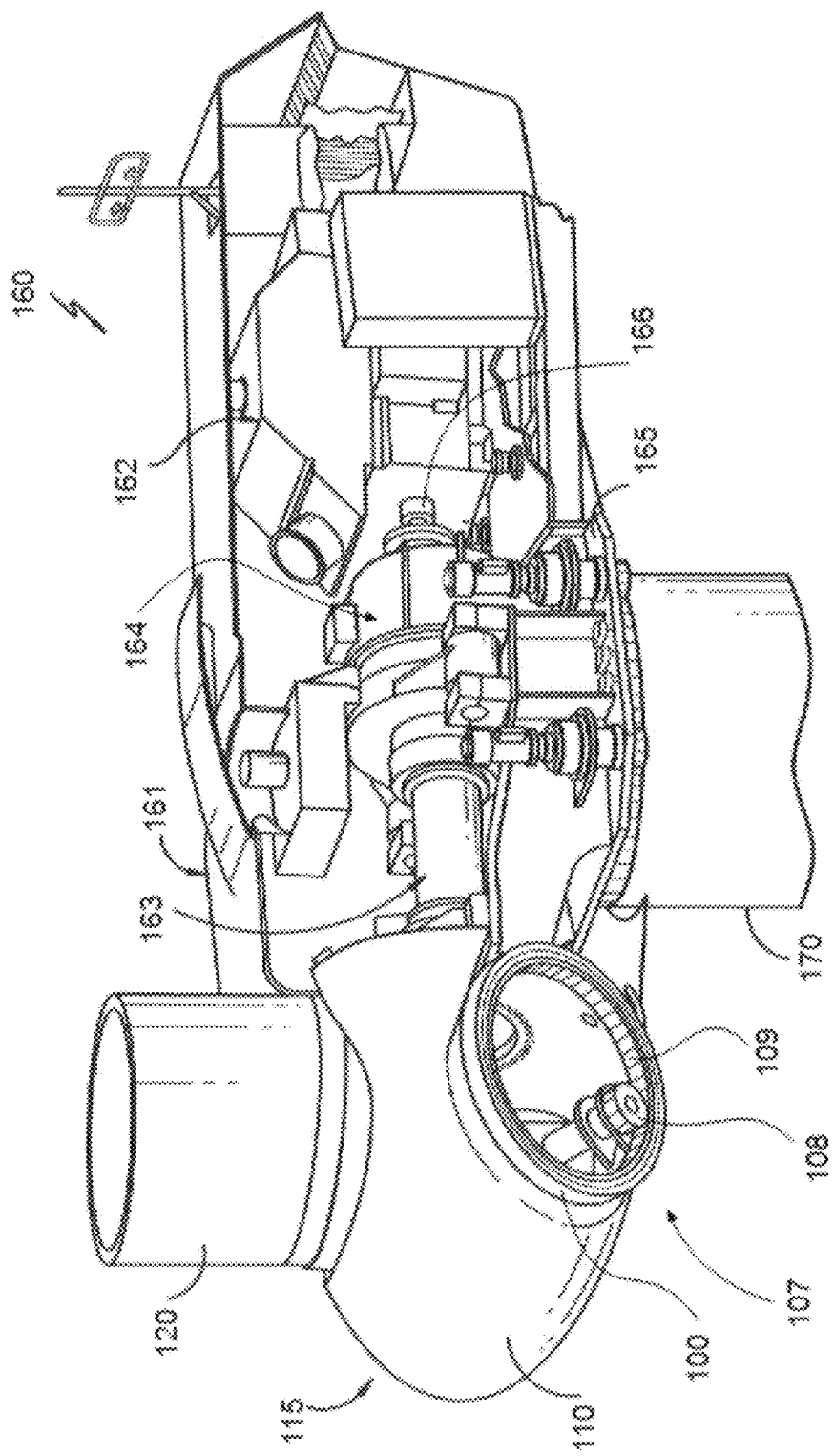
FIG. 2 illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that mesh with an annular gear 109 provided on the inner bearing ring to set the wind turbine blade into rotation.

Figure 3:
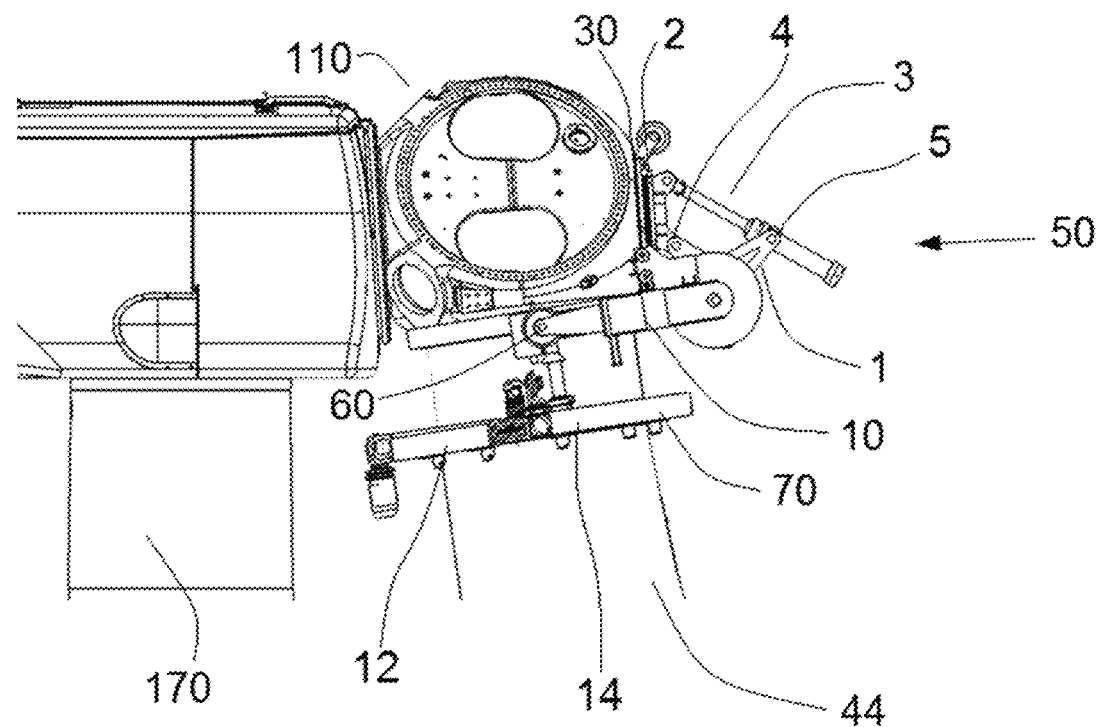
FIGS. 3-6 schematically represent an example of a hoisting accessory installed on a rotor hub of a wind turbine.

FIGS. 3-6 schematically represent an example of a hoisting accessory installed on a rotor hub of a wind turbine according to an example. In FIG. 3, a wind turbine is shown comprising a rotor hub 110, positioned on a wind turbine tower 170, wherein the rotor hub 110 is configured to rotate around a rotational axis. The rotor hub (as shown in FIG. 1) is configured to comprise a plurality of rotor blades. In the situation shown in FIG. 3, one of these blades, blade 44, is in the process of being mounted.

The hoisting accessory 50 comprises a connector 2 which is rotatably attached to the rotor hub 110. In this particular example, the hoisting accessory may be attached to a front surface of the hub. The front surface may include one or more anchoring or mounting elements. In other examples, the hub may have another surface adapted for attachment of the hoisting accessory.

In examples, the connector may comprise a bearing mechanism enabling the rotation of the connector with respect to the rotor hub 110 (and in the example of FIG. 3, the front surface 30). For example, the bearing mechanism may comprise an outer bearing ring configured to be connected to the front surface 30 and an inner bearing ring configured to be connected to the connector 2 and, in use, between these two bearing rings one or more rows of rolling elements which allow both bearing rings to rotate relative to each other.

The hoisting accessory 50 may further comprise a hoist guide 10. The hoist guide 10 comprises one or more wire guides 60 for guiding hoisting wires to a wind turbine blade. The hoist guide 10 is pivotally connected to the connector 2. The hoisting accessory further comprises a steering mechanism 3 for controlling an orientation of the hoist guide 10 with respect to the connector 2.

In some examples, such as the example shown in FIGS. 3-6, the hoisting accessory further comprises an intermediate support 1 connecting the connector 2 with the hoist guide 10. As shown in the example of FIG. 3, the first steering mechanism is configured to control an orientation of the intermediate support 1 with respect to the connector 2. In some further examples, the hoist guide may be pivotally connected to the intermediate support and the hoisting accessory comprises a second steering mechanism (not illustrated here) configured to control an orientation of the hoist guide with respect to the intermediate support.

Figure 4:
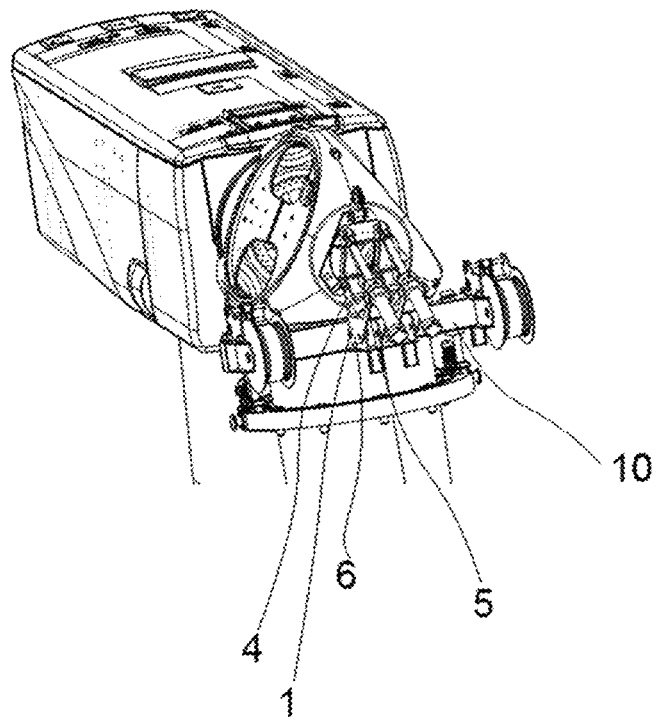

The intermediate support 1 in this example extends from a first end 4 to a second end 5. The first end 4 of the intermediate support 1 may be pivotally attached to a connector 2. Moreover, the second end 5 of the intermediate support 1 may be pivotally attached to a first steering mechanism 3. As shown in FIG. 4, the support 1 may further comprise two brackets 6. The brackets 6 may be operationally attached to the hoist guide 10. Particularly, in this example, the intermediate portion 6 is fixedly attached to the hoist guide 10.

In the example of FIGS. 3-6, the hoist guide 10 comprises a support carrying the one or more wire guides 60, and the support is shaped to fit around a root portion of the wind turbine blade. This may be appreciated e.g. in FIG. 4.

A hoisting accessory mounting surface 30 of the rotor hub may be a frontal mounting flange or a part of a rotor hub suitable for mounting the connector 2 of the hoisting accessory. In some examples, the hoisting accessory mounting surface 30 may comprise dedicated, especially prepared attachments for the sole purpose of attaching the hoisting accessory. In yet further examples, front attachments or surfaces prepared for lifting and manipulation of the rotor hub could be used for mounting the hoisting accessory.

As commented above, the intermediate support 1 may be provided with the first steering mechanism 3 e.g. a levelling system provided with one or more hydraulic cylinders or a hinge element adapted to control the orientation of an intermediate support 1 (and thus the hoist guide 10 operationally attached to the intermediate support 1) with respect to the connector 2. The first steering mechanism 3 may be attached between the second end 5 of the intermediate support 1 and the connector 2. In this respect, the first steering mechanism 3 may be configured to pivot and rotate the intermediate support 1 (and thus the hoist guide 10 operationally attached to the intermediate support 1) at different angles with respect to the connector 2.

Additionally, the first steering mechanism 3 may be provided with a locking mechanism (not shown). The first steering mechanism 3 may thus be locked in a determined position (and thus the hoist guide 10 may be locked at a desired angle with respect to the connector 2).

In this example, a blade root attachment 70 may be provided for attachment to a root portion of a wind turbine blade 44, wherein the hoisting accessory 50 and blade root attachment 70 are configured to be connected by hoisting wires.

Figure 6:
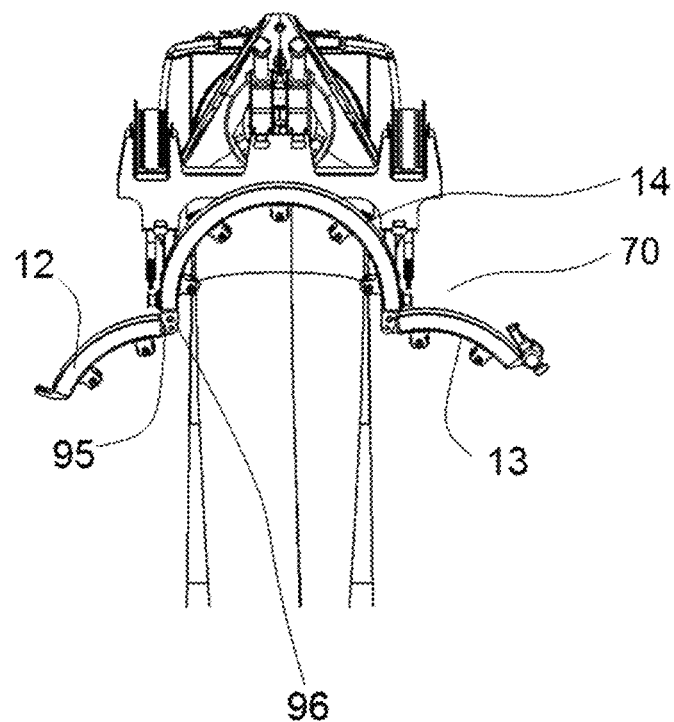

Moreover, as shown in FIG. 6, such a blade root attachment 70 may comprise a first blade root attachment segment 12, a second blade root attachment segment 13 and a central blade root attachment segment 14. The first blade root attachment segment 12 may comprise a first end 95 pivotally connected to a first end 96 of the central segment 14 using e.g. a hinge. Similarly, the second blade root attachment segment 13 may be pivotally connected to the central blade root attachment segment 14. The various segments may in particular be ring segments.

With such an arrangement, the first and the second blade root attachment segment 12, 13 may be rotated between two different positions, namely a closed and an open position of the blade root attachment 70.

Figure 5:
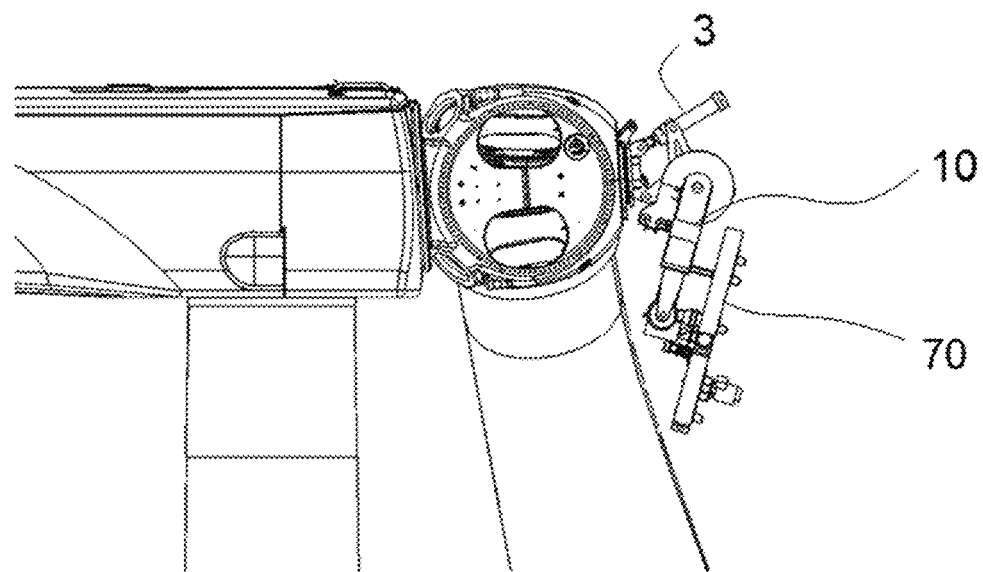

FIGS. 5 and 6 illustrate an open position of the blade root attachment. As shown in FIG. 5, with the blade root attachment 70 in this open position, the first steering mechanism 3 may be actuated and the hoist guide 10 may be freely pivoted between a first operational position and a second operational position wherein the hoisting accessory 50 does not interfere with a previously installed blade when the rotor hub is rotated.

Again in FIG. 3, the hoist guide 10 may further be pivoted using the first steering mechanism 3 to an illustrated first operational position. The blade root attachment 70 is shown attached to the root portion of the blade and connected the hoisting accessory 50 using hoisting wires.

A root part of a blade can thus be hoisted and it can traverse a space within the hoist guide 10. This way, the root blade part can be aligned and subsequently be connected to a mounting surface of the rotor hub.

Figure 7:
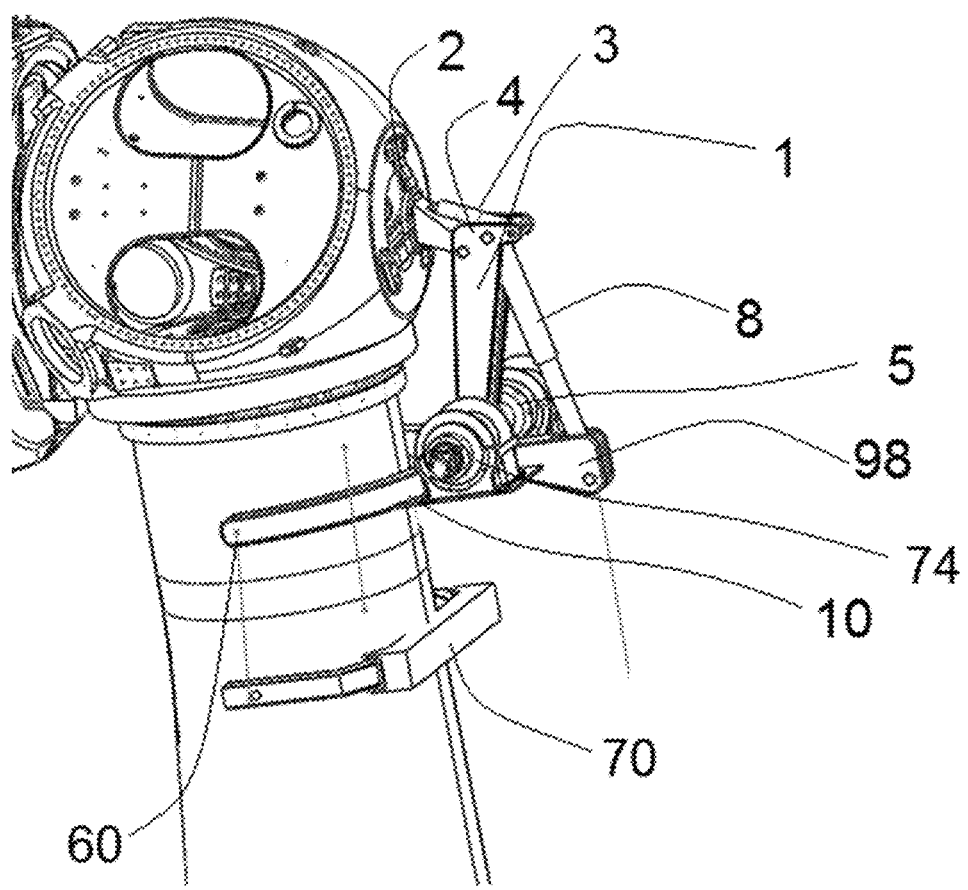
FIG. 7 schematically represents a hoisting accessory installed on a rotor hub of a wind turbine according to a further example.

FIG. 7 schematically represents a hoisting accessory installed on a rotor hub of a wind turbine according to a further example. The hoisting accessory shown in FIG. 7 differs from the hoisting accessory shown in FIGS. 3-6 in that, in addition to a first steering mechanism 3, a second steering mechanism 8 is included. A further difference is that the second end 5 of the intermediate support 1 is pivotally mounted with respect to the hoist guide 10. The structure and operation of the remaining components of the system may substantially be the same or similar as hereinbefore described.

In this respect, the hoisting accessory is shown having an intermediate support 1. The intermediate support 1 extends from a first end 4 to a second end 5. The first end 4 of the intermediate support 1 may be pivotally attached to a connector 2. Additionally, the second end 5 may be pivotally attached to the hoist guide 10.

The intermediate support 1 may be provided with a second steering mechanism 8 adapted to control the orientation of the hoist guide 10 with respect to the intermediate support 1. The second steering mechanism 8 may be attached between the first end 4 of the intermediate support 1 and a portion 98 of the hoist guide 10. In this respect, the second steering mechanism 8 may be configured to pivot and rotate the hoist guide 10 at different angles with respect to the intermediate support 1. Similarly as before, the second steering mechanism may be provided with a locking mechanism (not visible). The second steering mechanism 8 may thus be locked in a determined position (and thus the hoist guide 10 may be locked at an angle with respect to the intermediate support 1).

As schematically illustrated in FIG. 7, the wire guides 60 may be holes or guides in the ring shaped support.

Figure 8:
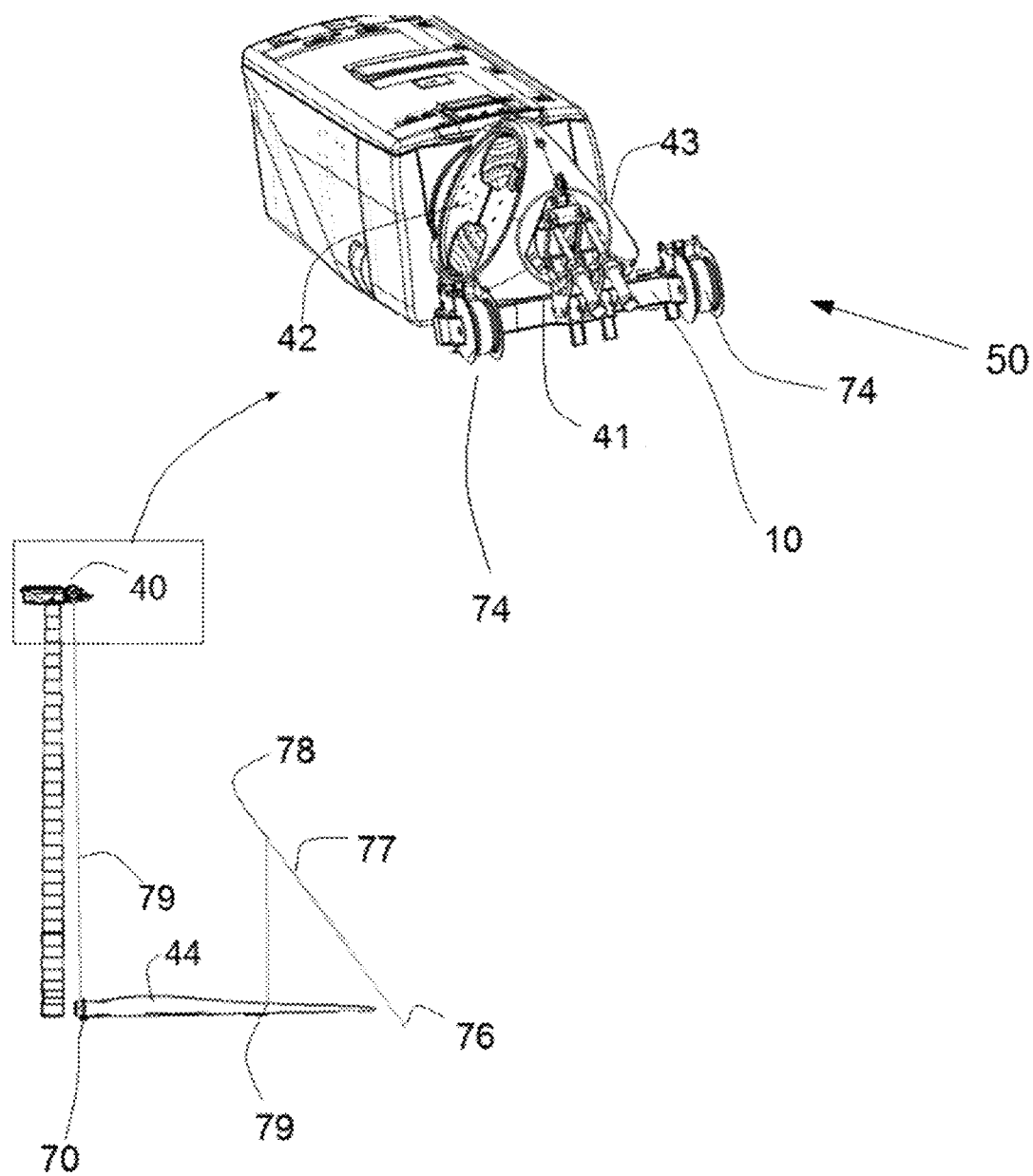
FIGS. 8-13 schematically illustrate a sequence of situations occurring during an example of a method for installing a blade to a rotor hub of a wind turbine.

A hoisting kit may be provided which comprises a hosting accessory according to any of the examples herein disclosed, a blade root attachment 70 as hereinbefore described (see FIG. 8 and FIG. 3). As commented above, the blade root attachment 70 is configured to be attached to a root portion of a wind turbine blade 44, wherein the hoisting accessory 50 and blade root attachment 70 are adapted to be connected by the hoisting wires.

The hoisting accessory 50 may comprises one or more blade root winches 74, as illustrated most clearly FIGS. 3-7. In the examples of these figures, the hoisting accessory comprises additional wire guides, e.g. one or more rollers 60 in the form of deflecting rollers (e.g. pulleys) for deflecting hoisting wires from the blade root winches 74 toward the wind turbine blade.

In some other examples, the wire guides of the hoist guide instead are (part of) the blade root winches. I.e. the blade root winches 74 illustrated in FIG. 3 as mounted on hoist guide 10 may alternatively be mounted on blade root attachment 70.

In yet further examples, one or more separate blade root winches may be positioned on the ground or on a support on the ground, and the hoisting accessory would merely deflect the hoisting wires towards a blade root portion.

A hoisting kit may further comprise an outer blade attachment for attachment to a mid span portion or tip portion of the wind turbine blade and comprising one or more outer blade winches for hoisting the outer blade attachment. This will be illustrated in the following.

FIGS. 8-13 schematically illustrate a sequence of situations occurring during the performance of a method for installing a blade to a rotor hub of a wind turbine according to an example. Same reference numbers denote the same elements. The method is described below with reference to the sequences of situations illustrated by FIGS. 8-13.

In FIG. 8, a rotor hub 40 is be mounted e.g. to a nacelle on top of a wind turbine tower in such a way that the rotor hub 40 is rotatable around one axis with respect to the nacelle. The rotor hub 40 is shown, in the enlarged detail of FIG. 8, comprising a first blade mounting surface 41, a second blade mounting surface 42 and a third blade mounting surface 43. Each of these blade mounting surface 41-43 are adapted to receive a blade root. Moreover, each of these mounting surfaces 41-43 may comprise a pitch system (not shown) for rotating a blade to be mounted to the mounting surfaces. The rotation may be about a pitch axis i.e. a longitudinal axis of the blade when mounted to the hub.

In an example, a method for hoisting a wind turbine blade to a rotor hub of a wind turbine comprises providing a hoisting kit having a hoisting accessory 50, a blade root attachment 70, and an outer blade attachment 79. The hoisting kit includes a connector configured being rotatably attached to e.g. the front surface of the rotor hub, and a hoist guide 10 comprising one or more wire guides for guiding hoisting wires to a wind turbine blade 44. The hoist guide is pivotally connected to the connector and the hoisting accessory further comprises a first steering mechanism for controlling an orientation of the hoist guide 10 with respect to the connector.

The method further comprises providing one or more blade root winches 74, attaching the hoisting accessory 50 to e.g. the front surface of the rotor hub using the connector of the hoisting accessory. The blade root attachment 70 is attached at or near a blade root portion of the wind turbine blade (see FIG. 8) and hoisting wires from the blade root winches 74 via the wire guides of the hoisting accessory with the blade root attachment 70. Particularly, as shown in FIG. 3, the attachment of the blade root attachment to the root portion of the blade may be performed as follows: blade root attachment member 12 and the second blade root attachment member (not visible) of the ring 11 may be rotated with respect to the central blade root attachment member 14 such that the blade root attachment is moved to a closed position.

The outer blade attachment 79 is attached to the wind turbine blade in a mid span or tip portion of the wind turbine blade (see FIG. 8). One or more outer blade winches 76 are provided and the hoisting wires of the outer blade winches are connected to the outer blade attachment 79. Then the wind turbine blade is hoisted by controlling the blade root winches 74 and the outer blade winches 76.

The order of the steps of the method described herein may be changed, at least for some of the steps.

Figure 9:
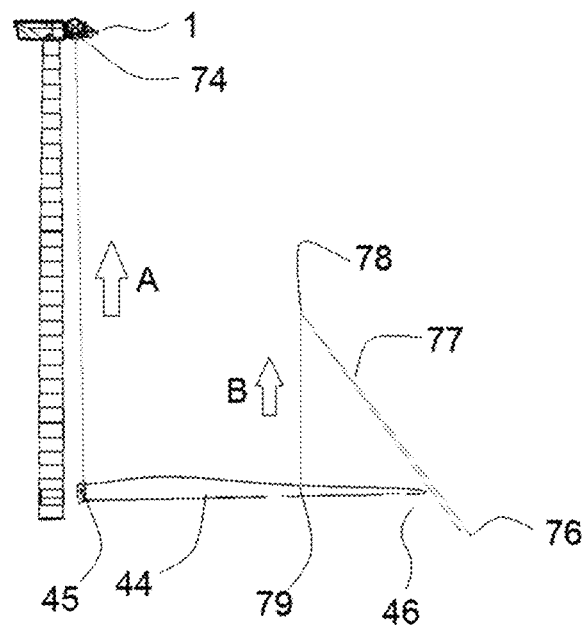
Figure 10:
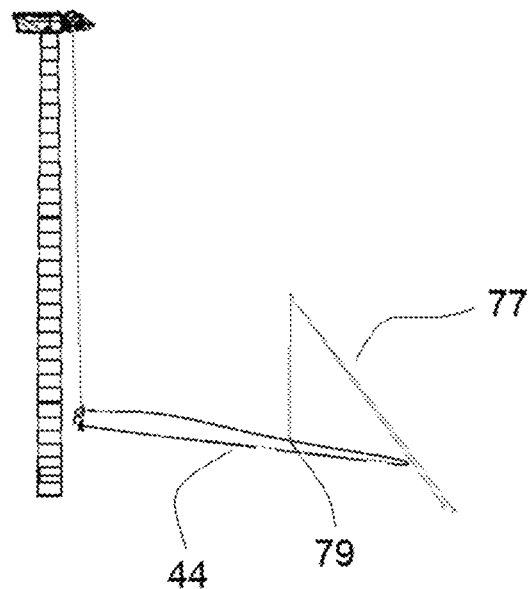
Figure 11:
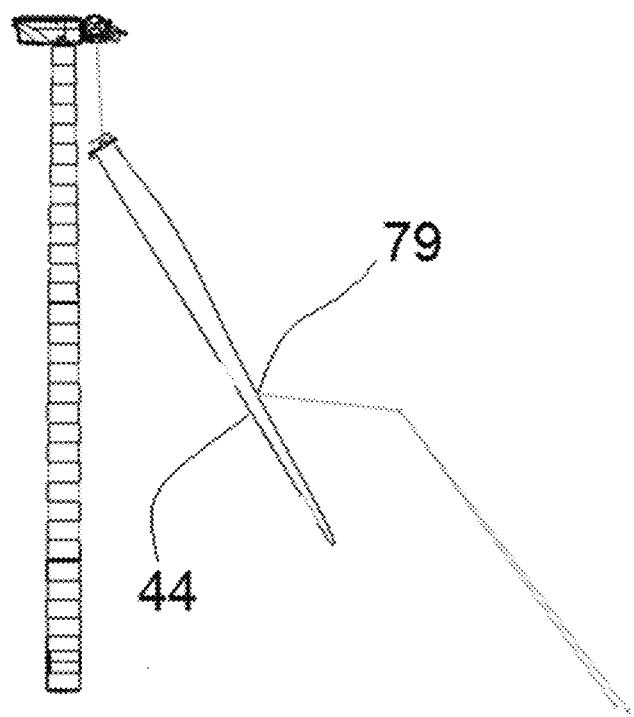

In some examples, hoisting the wind turbine blade by controlling the blade root winches and outer blade winches includes a first step of pulling in the hoisting wires of both the blade root winches and the outer blade winches. This is illustrated in FIG. 9, and a blade is lifted in a substantially horizontal position. The tip portion 46 of the blade and the root portion 45 of the blade are thus hoisted substantially simultaneously to a predefined height in the direction of the arrows (arrow A and B).

In further steps, method can include controlled pulling in of the hoisting wires of the blade root winches and controlled letting out of the hoisting wires of the outer blade winches. This is illustrated in consecutive FIGS. 10, 11 and 12. As the blade root winches pull in the wires and thereby hoist the blade root portion, the outer blade winches may be controlled to selectively pull in and let out the hoisting wires, so that the wind turbine blade 44 is able to assume a vertical position ultimately without the tip portion of the blade hitting the ground.

FIG. 8 illustrates an initial situation. In this initial situation, as shown in the enlarged detail of FIG. 8, the rotor hub 40 may be situated in a position which may be appropriate for installing the first blade 44.

A way to define these positions is with reference to an angular position of the hub. The 0° position for a blade may be regarded as a position in which it is arranged substantially vertically, pointing downwards. The mounting surfaces are thus arranged in the specific situation shown at 0° (mounting surface 41), 120° (mounting surface 42) and 240° (or −120° for mounting surface 43).

Moreover, the blade 44 is shown in a substantially horizontal position e.g. lying on the ground.

In examples, the rotor hub 40 may be situated in a position which may not be appropriate for installing the blade 44. A first rotation of the hub (not carrying any blades) to a position suitable to mount the first blade in a substantially vertical position may thus be performed. The first rotation of the hub may be carried out using the generator as a motor or some auxiliary driving equipment which is suitable for rotating a hub.

In examples, the blade root attachment 70 may be a C-shaped attachment configured to be attached to a root portion of the blade 44. The blade root attachment may comprise suitable fasteners or gripping mechanisms. The blade root attachment may be fixed to or integrally formed with the blade, e.g. a protrusion integrally formed with the blade root part.

In the example of FIG. 8, the blade root winches 74 are fixedly attached to the hoist guide 10. However, some other suitable locations for the lifting equipment 74 may be possible e.g. attached to the blade root attachment 70 or located on the ground.

In this example, the outer blade winches 76 may be located e.g. on the ground although some other locations are possible. In the example, a wire guide 78 e.g. a pulley may be provided on the top of a structure or support e.g. a pole (not shown). The third wire 77 is thus configured to pass around the guide 78. In other examples, the outer blade winches may be positioned on such a pole or structure with sufficient height, rather than on the floor.

The outer blade attachment may be a C-shaped blade attachment. The structure and operation of the C-shaped attachment may be the same or similar to the one described for the attachment 70.

Figure 12:
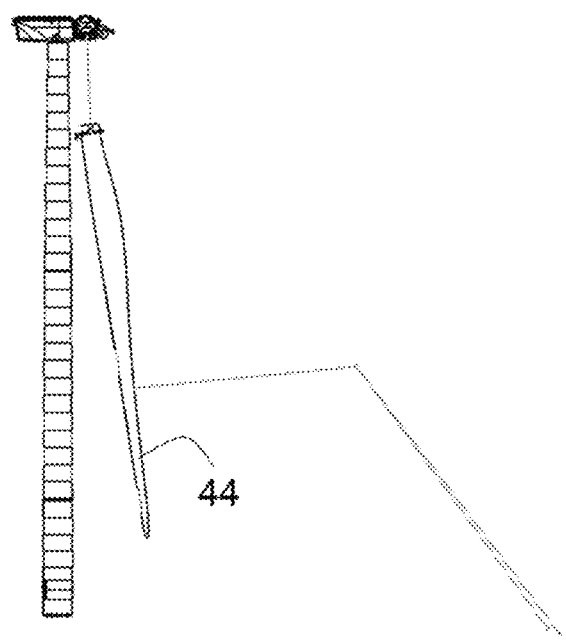

In FIG. 12, the blade has performed approximately a 180° rotation, and has achieved a substantially vertical position. In this situation, the blade root winches remains activated and thus hoist the root portion of the blade.

Figure 13:
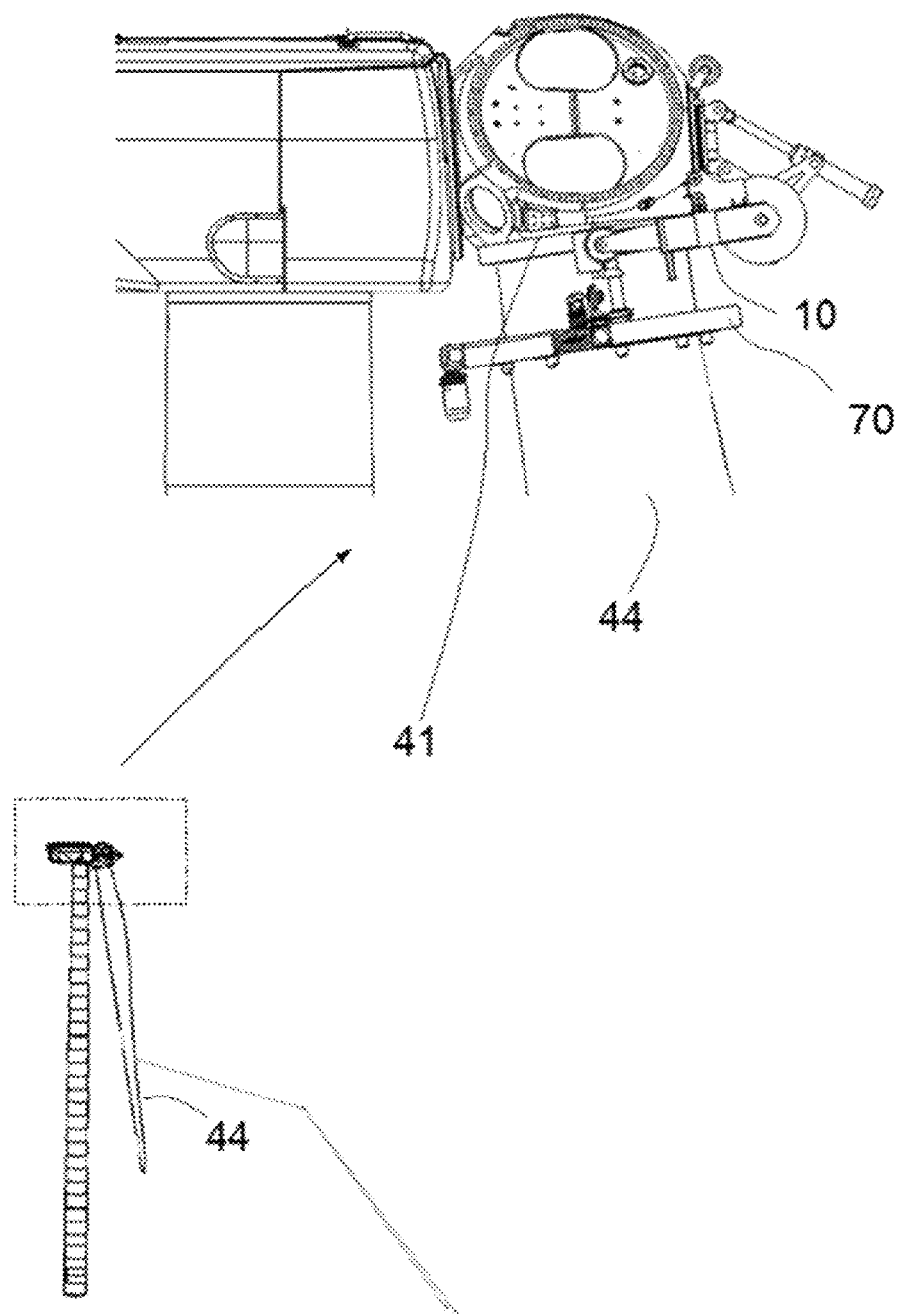

In FIG. 13, particularly in the enlarged detail of this figure, the root portion of the blade 44 has already been brought in proximity of hub and it has at least partially passed through a space of the hoist guide 10.

The root portion of the blade 44 may be provided with a plurality of fasteners such as bolts or pins or studs. The first mounting surface 41 may comprise a plurality of holes in which the fasteners are to be fitted in order to assemble the blade 44 with the rotor hub.

Once the root part of the blade has traversed the space within the hoist guide, a plurality of studs of the blade may be inserted into a plurality of holes of the rotor hub. The plurality of studs of the blade may be properly aligned with the corresponding plurality of holes of the rotor hub resulting from the position and control of the blade root winches with respect to the blade root attachment and the blade root. This way, the blade may be aligned with the mounting surface in a relatively easy manner and thus attachment of the blade and the mounting surface is facilitated.

At this point, the blade may be mounted vertically. Mounting blades in a substantially vertical manner is generally a preferred option since such an operation may be carried out at higher wind speeds than other operations, and importantly there is no need to lift a blade towards a height above the hub.

In examples, the methods for hoisting may further comprise changing an orientation of the hoist guide 10 with respect to the connector from a first orientation. Then the wind turbine hub is rotated and a second wind turbine blade is hoisted. This is partly illustrated in FIGS. 5 and 6.

Once the blade 44 is mounted, as shown in FIGS. 5-6, the blade root attachment 70 may be opened and the hoist guide 10 may be pivoted to a second operational position. The hoisting accessory thus does not interfere with the previously mounted blade 44 in case the rotor hub is rotated. Additionally, as commented above, the connection element 2 of the hoisting accessory may be provided with a bearing mechanism (not visible). It is thus clear that there is no need to remove the previously installed hoisting accessory in order to rotate the hub and install a second blade.

Following the example, after the installation of the first blade as hereinbefore described, the rotor hub may be rotated so that a next blade can be mounted. Particularly, the rotor hub may be rotated in a in a clockwise direction e.g. towards a position in which the second mounting surface 43 is arranged so as to receive a second blade in a substantially vertical manner i.e. at 0°. At that point, the locking mechanism could be activated again.

As commented above, the hoisting accessory has been pivoted to a second operational position. The hoisting accessory may thus remain connected to the frontal mounting surface 30 of the rotor hub using the above-commented bearing mechanism with no interferences in the normal performance of the wind turbine. In this case, the dismantling of the hoisting accessory is avoided and this may save time during installation.

Once the rotor hub is rotated to a suitable position for mounting the second blade, the hoisting accessory is pivoted again to a first operational position wherein the hoist guide 10 at least partially surrounds a portion of a consecutive blade root (once this blade has been lifted sufficiently).

Then, a second blade may be hoisted and mounted to the second mounting surface 43 in a substantially similar manner as hereinbefore described.

Evidently, the third blade may be mounted to the third mounting surface in a substantially similar manner as hereinbefore described.

In an aspect of the present disclosure, a method for hoisting a first and second wind turbine blade to a rotor hub of a wind turbine is provided. The wind turbine comprising a rotor hub positioned on a wind turbine tower such that the rotor hub is configured to rotate around a rotational axis, the rotor hub comprising one or more blade mounting surfaces. The method comprises: rotatably attaching a connector to the rotor hub, a hoist guide comprising one or more wire guides for guiding hoisting wires being pivotally connected to the connector; hoisting the first wind turbine blade using the hoist guide in a hoisting position, attaching a root of the first wind turbine blade to a first blade mounting surface of the blade mounting surfaces. The method further comprises: pivoting the hoist guide to a passive position, rotating the hub, pivoting the hoist guide to the hoisting position and hoisting the second wind turbine blade.

In some examples, hoisting the first wind turbine blade comprises hoisting the first wind turbine blade to a substantially vertical position to attach the root of the first wind turbine blade to the first blade mounting surface.

In some examples, rotating the hub comprises rotating the hub to a position in which a second blade mounting surface faces vertically downwards.

In examples, hoisting the first wind turbine blade includes providing one or more blade root winches and one or more outer blade winches, attaching a blade root attachment at or near a blade root portion of the first wind turbine blade, connecting hoisting wires from the blade root winches via the wire guides of the hoisting accessory with the blade root attachment, attaching an outer blade attachment to the first wind turbine blade in a mid span or tip portion of the wind turbine blade, connecting hoisting wires of the outer blade winches to the outer blade attachment, and controlling the blade root winches and the outer blade winches to hoist the first wind turbine blade.

In further examples, controlling the blade root winches and outer blade winches includes a first step of pulling in the hoisting wires of both the blade root winches and the outer blade winches.

In an aspect of the present disclosure, a hoisting accessory for a wind turbine is provided. The hoisting accessory is configured to be rotatably attached to the front surface of the rotor hub and is further configured to assume a hoisting configuration and a passive configuration. In the hoisting configuration (examples of which are illustrated e.g. in FIGS. 7 and 8), a wind turbine blade can be hoisted and mounted substantially vertically to the rotor hub, and wherein in the passive configuration (an example of which is illustrated in FIG. 5), the rotor hub carrying one or more wind turbine blades can be rotated.

In some examples, the hoisting accessory comprises a connector for rotatably attaching the hoisting accessory to the front surface of the rotor hub, and a hoist guide comprising one or more rollers for guiding hoisting wires towards a wind turbine blade.

In some examples, the hoisting accessory further comprises a steering mechanism to convert the hoisting accessory between the hoisting configuration and the passive configuration.

In some examples, as illustrated in the figures, in the passive configuration the hoist guide is in a substantially horizontal position and in the hoisting configuration the hoist guide is in a substantially vertical position.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A hoisting accessory for a wind turbine, the wind turbine comprising a rotor hub positioned on a wind turbine tower such that the rotor hub is configured to rotate around a rotational axis, the rotor hub comprising one or more blade mounting surfaces, the hoisting accessory comprising:
    a connector rotatably attached to a front-most point on a front surface of the rotor hub and extending downward therefrom;
    a hoist guide comprising first and second wire guides for guiding first and second hoisting wires to a wind turbine blade, wherein the hoist guide is pivotally connected to the connector, the first and second wire guides positioned on opposing sides of the rotor hub;
    the first and second hoisting wires connected at respective first ends to the wind turbine blade of the wind turbine and at respective second ends to the first and second wire guides; and
    a first steering mechanism for controlling an orientation of the hoist guide with respect to the connector.

2. The hoisting accessory according to claim 1, wherein the hoist guide comprises a support carrying the first and second wire guides and wherein the support is shaped to fit around a root portion of the wind turbine blade.

3. The hoisting accessory according to claim 1, further comprising an intermediate support connecting the connector with the hoist guide, wherein the first steering mechanism controls an orientation of the intermediate support with respect to the connector.

4. The hoisting accessory according to claim 3, wherein the hoist guide is pivotally connected to the intermediate support and the hoisting accessory further comprises a second steering mechanism configured to control an orientation of the hoist guide with respect to the intermediate support.

5. A hoisting kit comprising:
    a hosting accessory according to claim 1, and a blade root attachment for attachment to a root of the wind turbine blade, wherein the hoisting accessory and blade root attachment are connected by the hoisting wires.

6. The kit according to claim 5, further comprising one or more separate blade root winches.

7. The kit according to claim 5, further comprising a second blade attachment for attachment to a mid-span portion or tip portion of the wind turbine blade and comprising one or more outer blade winches for hoisting the second blade attachment.

8. The kit according to claim 5, wherein the hoisting accessory comprises one or more blade root winches.

9. The kit according to claim 8, wherein the first and second wire guides of the hoist guide are the blade root winches.

10. The kit according to claim 8, wherein the first and second wire guides are deflecting rollers for deflecting the hoisting wires from the blade root winches toward the wind turbine blade.

* * * * *